US007736223B2

(12) United States Patent
Pace

(10) Patent No.: US 7,736,223 B2
(45) Date of Patent: Jun. 15, 2010

(54) ELECTRONIC GAMING METHOD AND SYSTEM HAVING PREVIEW SCREEN

(75) Inventor: Michael R. Pace, 735 Champions Club Dr., Alpharetta, GA (US) 30004

(73) Assignee: Michael R. Pace, Alpharetta, GA (US)

( * ) Notice: Subject to any disclaimer, the term of this patent is extended or adjusted under 35 U.S.C. 154(b) by 579 days.

(21) Appl. No.: 11/428,026

(22) Filed: Jun. 30, 2006

(65) Prior Publication Data

US 2007/0232384 A1 Oct. 4, 2007

Related U.S. Application Data

(63) Continuation-in-part of application No. 11/430,770, filed on May 9, 2006.

(60) Provisional application No. 60/788,363, filed on Mar. 31, 2006.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2006.01) |

(52) U.S. Cl. ............................. 463/19; 463/16; 463/20; 463/21; 463/22

(58) Field of Classification Search .................. 463/16, 463/19–22

See application file for complete search history.

(56) References Cited

U.S. PATENT DOCUMENTS

| | | | | |
|---|---|---|---|---|
| 6,028,604 | A * | 2/2000 | Matthews et al. | 715/821 |
| 7,040,985 | B2 * | 5/2006 | Vancura | 463/20 |
| 2005/0003883 | A1 * | 1/2005 | Muir et al. | 463/16 |
| 2005/0202385 | A1 * | 9/2005 | Coward et al. | 434/307 R |

OTHER PUBLICATIONS

Turner, "Tic-Tac-Fruit: An Analysis," Nov. 15, 2004.

Farley, "Report on the Review and Analysis of the Tic-Tac-Fruit Game," Letter to Kurt O. Gearhiser, Esq., Mar. 7, 2005.

* cited by examiner

*Primary Examiner*—John M Hotaling, II
*Assistant Examiner*—Adetokunbo Torimiro
(74) *Attorney, Agent, or Firm*—Womble Carlyle Sandridge & Rice, PLLC

(57) ABSTRACT

An electronic gaming method and system with a game preview display. A field of game symbols is presented on the game display to the player as a preview for deciding whether or not to play the displayed game. If the player decides to play the game, the player selects a field element to turn the symbol displayed into a wild symbol. The player's selection of the field element for the wild symbol location is received by the game software which determines and displays each winning combination of symbols that is formed by such wild symbol location selection. A new game field can then be constructed and previewed on the game display.

75 Claims, 9 Drawing Sheets

| PLAY DENOMINATION (300) | PLAYER RETURN (302) | OPERATOR PROFIT PER PLAY (304) | TOTAL PLAYS (306) | GAME PROVIDER PROFIT (308) | GAME PROVIDER CHARGE PER PLAY (310) | OPERATOR PROFIT PER FILL (312) |
|---|---|---|---|---|---|---|
| 0.25 | 85% | $0.0375 | 200K | 15.6% | $0.00585 | $7,500.00 |
| 0.50 | 87% | $0.0650 | 140K | 12.9% | $0.00836 | $9,100.00 |
| 0.75 | 89% | $0.0825 | 130K | 10.9% | $0.009 | $10,725.00 |
| 1.00 | 90% | $0.1000 | 120K | 9.75% | $0.00975 | $12,000.00 |
| 2.00 | 92% | $0.1600 | 85K | 8.60% | $0.01376 | $13,600.00 |
| 3.00 | 93% | $0.2100 | 75K | 7.43% | $0.0156 | $15,750.00 |
| 4.00 | 94% | $0.2400 | 75K | 6.50% | $0.0156 | $18,000.00 |
| 5.00 | 95% | $0.2500 | 75K | 6.24% | $0.0156 | $18,750.00 |

FIG. 3

400 402 404 406 408 410

| CRD | VALUE | COUNT | PLAYS | RATE USE% | LEFT |
|---|---|---|---|---|---|
| 1 | $0.25 | 200,000 | 0 | 0.0000% | 199,982 |
| 2 | $0.50 | 140,000 | 2 | 0.0014% | 139,988 |
| 3 | $0.75 | 130,000 | 0 | 0.0000% | 129,988 |
| 4 | $1.00 | 120,000 | 1 | 0.0008% | 119,989 |
| 8 | $2.00 | 85,000 | 0 | 0.0000% | 84,992 |
| 12 | $3.00 | 75,000 | 0 | 0.0000% | 74,993 |
| 16 | $4.00 | 75,000 | 5 | 0.0067% | 74,993 |
| 20 | $5.00 | 75,000 | 0 | 0.0000% | 74,993 |
| COLUMN TOTALS | | | 8 | 0.0089% | |

FIG. 4

ELECTRONIC GAMING METHOD AND SYSTEM HAVING PREVIEW SCREEN

CROSS-REFERENCE TO RELATED APPLICATIONS

This is a continuation-in-part of application Ser. No. 11/430,770, filed May 9, 2006, which claims the benefit of Provisional Application No. 60/788,363, filed Mar. 31, 2006.

BACKGROUND OF THE INVENTION

The present invention is related generally to amusement and entertainment electronic gaming and, more particularly, to a method and system for providing a game preview display to players of an amusement or entertainment electronic game before playing the game.

Amusement and entertainment type electronic games have become very popular with the public and, as their popularity has increased, several states have legalized certain types of gaming but under heavy regulation. For example, the state of Ohio generally prohibits, pursuant to statutes, gambling and the use of any gambling devices. However, skill-based amusement machines are permitted. To qualify as a skill-based amusement machine in Ohio, the outcome of play during the game must be controlled by the person playing the game and not by predetermined odds or random chance controlled by the machine. Some chance can be part of a skill-based amusement game, but skill must be the predominant feature. The play on the machine must involve a task, game, play, contest, competition or tournament in which the player actively participates.

On a Federal level, Congress enacted the Indian Gaming Regulatory Act (IGRA) in 1988 to regulate gaming operations run by Indian tribes on Indian land. The IGRA established three classes of games with a different regulatory scheme for each. Class I gaming is defined as traditional Indian gaming and social gaming for minimal prizes. Regulatory authority over class I gaming is vested exclusively in tribal governments.

Class II gaming is defined as the game of chance commonly known as bingo (whether or not electronic, computer, or other technological aids are used in connection therewith) and if played in the same location as the bingo, pull tabs, punch board, tip jars, instant bingo, and other games similar to bingo. Class II gaming also includes non-banked card games, i.e., games that are played exclusively against other players rather than against the house or a player acting as a bank. The IGRA specifically excludes slot machines or electronic facsimiles of any game of chance from the definition of class II games. Tribes retain their authority to conduct, license, and regulate class II gaming as long as the state in which the Tribe is located permits such gaming for any purpose and the Tribal government adopts a gaming ordinance approved by the National Indian Gaming Commission (NIGC). Tribal governments are responsible for regulating class II gaming with NIGC oversight.

Class III games include any games that are not class I or class II such as slots, video poker, video blackjack, video Keno, etc. that are usually offered in state-regulated casinos.

SUMMARY OF THE INVENTION

The present invention is directed to a system and method for providing a game preview display to players of an amusement or entertainment electronic game before playing the game. The invention also provides a game structure having a finite number of game plays for each electronic (virtual) cartridge. Each game cartridge can provide a fixed or variable number of game plays as described herein. Variable number of game plays per cartridge are controlled by an action taken by a player before game play begins, such as selecting a denomination of play. The electronic game service provider supplies reloads of virtual game cartridges to the game operator or game distributor when all game plays for all cartridges are depleted.

In one aspect of the invention, an electronic gaming method with a game preview display is provided to a player. A game field is constructed having a plurality of elements on a game display wherein each element is filled by a game symbol from a plurality of available game symbols. The game symbols for each element are automatically determined such that there is no winning combination without player interaction. The field of game symbols is presented on the game display to the player as a preview for deciding whether or not to play the displayed game. If the player decides to play the game, the player selects a field element to turn the symbol displayed into a wild symbol. The player's selection of the field element for the wild symbol location is received by the game software which determines each winning combination of symbols that is formed by such wild symbol location selection. Each winning combination of symbols on the field of game symbols is displayed to the player. A new game field could then be constructed and presented on the game display.

In another aspect of the invention, a system is provided for electronic gaming with a game preview display. A game processor generates an electronic game display on a game terminal with a plurality of options selectable by a player. The game processor includes: (1) a component for constructing a field having a plurality of elements for a game display with each element being filled by a game symbol from a plurality of available game symbols, wherein the game symbols for each element are automatically determined such that there is no winning combination without player interaction; (2) a component for presenting the field of game symbols to the player as a preview for deciding whether or not to play the displayed game; (3) a component for receiving the player's selection of a field element as a location for a wild symbol and determining each winning combination of symbols that is formed by such selection; and (4) a component for displaying each winning combination of symbols on the field of game symbols.

In another aspect of the invention, a computer program product is provided for electronic gaming with a game preview display. The computer program product comprises a computer readable medium having computer readable code embedded therein. The computer readable medium includes: (1) program instructions that construct a field having a plurality of elements for a game display with each element being filled by a game symbol from a plurality of available game symbols, wherein the game symbols for each element are automatically determined such that there is no winning combination without player interaction; (2) program instructions that present the field of game symbols to the player as a preview for deciding whether or not to play the displayed game; (3) program instructions that receive the player's selection of a field element as a location for a wild symbol and determine each winning combination of symbols that is formed by such selection; and (4) program instructions that display each winning combination of symbols on the field of game symbols.

In yet another aspect of the invention, a method, system, and program product for electronic gaming are provided that can be integrated with various types of electronic games. A game field is constructed having a plurality of elements for a game display wherein each element is filled by a game symbol from a plurality of available game symbols. The field of game symbols is presented on the game display to the player as a preview for deciding whether to play the displayed game. If the player decides to play the displayed game, an outcome is displayed on the game display.

BRIEF DESCRIPTION OF THE DRAWINGS

These and other advantages and aspects of the present invention will become apparent and more readily appreciated from the following detailed description of the invention taken in conjunction with the accompanying drawings, as follows.

FIG. 3 illustrates an exemplary payout scheme for varying denominations of play in an exemplary embodiment.

FIG. 4 illustrates game terminal status receipts available to the operator of electronic games in the "plays level" exemplary embodiment.

DETAILED DESCRIPTION OF THE INVENTION

Figure 1A:
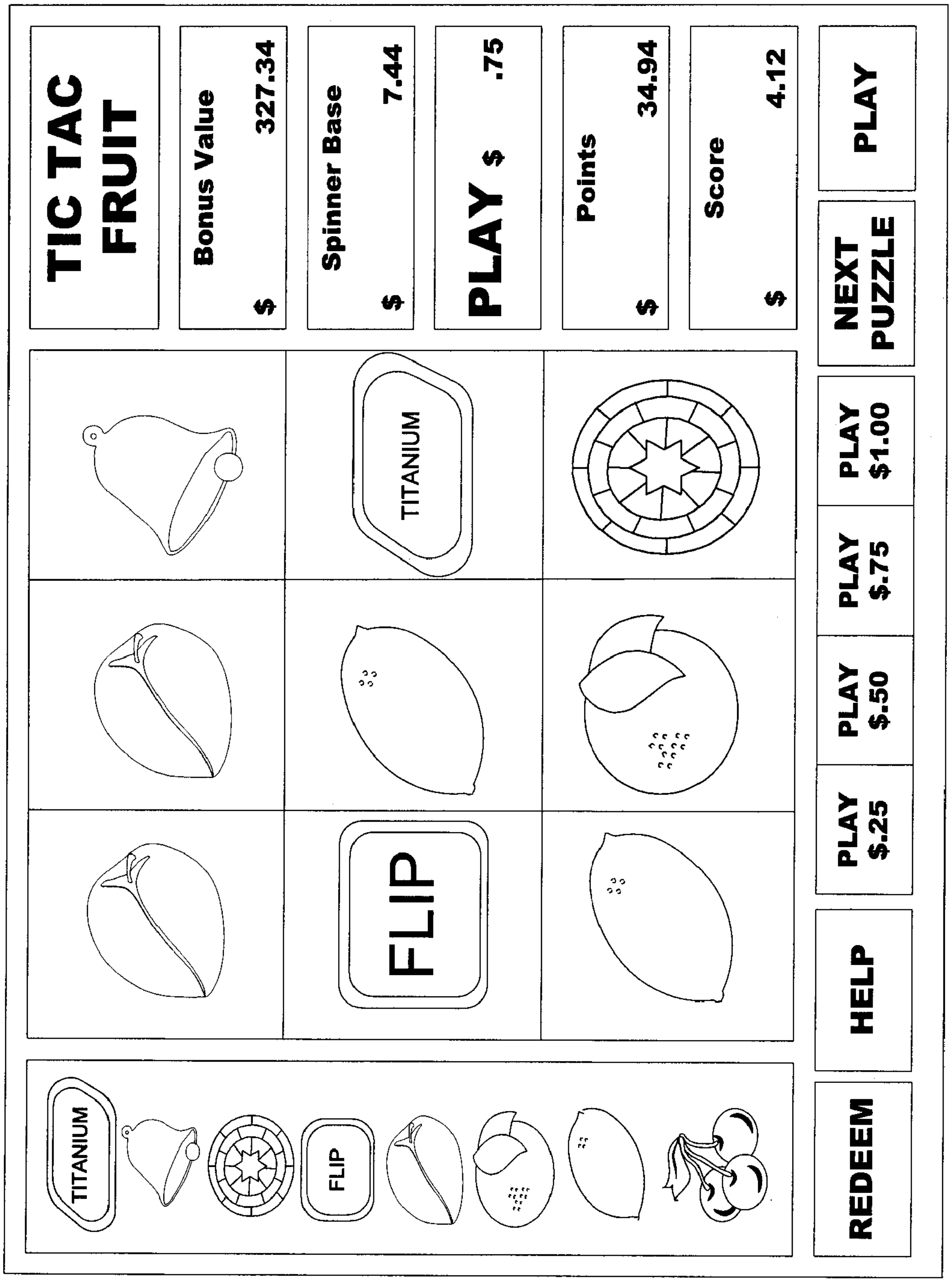
FIGS. 1A-1B illustrate electronic game displays for a skill-based game in which the present invention can be implemented.

The following description of the invention is provided as an enabling teaching of the invention and its best, currently known embodiment. Those skilled in the relevant art will recognize that many changes can be made to the embodiments described, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and may even be desirable in certain circumstances, and are a part of the present invention. Thus, the following description is provided as illustrative of the principles of the present invention and not in limitation thereof, since the scope of the present invention is defined by the claims.

The present invention will be described in the context of the Tic-Tac Fruit electronic skill-based amusement game developed and licensed by Pace-O-Matic, Inc. Tic-Tac Fruit is a game loosely derived from tic-tac-toe that uses player skill to solve a puzzle. The similarity to tic-tac-toe extends from the use of a field or grid of nine spots or tiles arranged in a three by three array. On each play of the electronic game, the game software program constructs a puzzle or task for the player to solve. The electronic game always incorporates at least one correct solution and sometimes generates alternative solutions that may not provide the same prize as the best solution.

The Tic-Tac-Fruit electronic game is a single player game. The player is presented a field completely filled with apparently random symbols selected from a set of nine symbols that includes a "wild" symbol. The "wild" symbol can represent any of the other symbols in the set of game symbols. The "wild" symbol is identical in concept to the "wild card" in card games. The player chooses the displayed symbol in the field to become the "wild" symbol and the symbol(s) that it represents becomes the symbol necessary to complete a winning line(s). The game constructs the field so that the initial field does not place three of the same symbols in a row wherein a row is interpreted as being oriented horizontally, vertically, or diagonally. The field constructed does not include the "wild" symbol. With a three by three field, there are eight possible lines: three horizontal lines, three vertical lines, and two diagonal lines. The player gets a choice of replacing one of the initial nine spots or tiles with the "wild" symbol. The game's construction of the field guarantees that at least one line may be formed by placing the wild symbol selection in the proper spot. On average, two lines may be formed if the optimal spot for the "wild" symbol is selected. However, there is always the possibility that at least one line can be formed.

The player's skills enters into play as the player is given a short period of time in which to choose the "wild" symbol location. Since some symbols are more valuable than others and some locations for the wild symbol may complete multiple lines, a player must quickly examine all nine locations and determine the optimal location for the wild symbol. Once the player selects a location, the game converts the symbol displayed in the element to a wild symbol and examines the field of elements for complete lines and awards points accordingly.

Since there are eight symbols and nine spots on the field, the total number of combinations is approximately 134 million. However, since a field cannot have any initial complete lines, the total number of initial combinations is reduced to approximately 118 million. Valid fields are determined by using an embedded computer processor to iterate through and test each combination to determine if it has any complete lines. If any lines are complete, the combination is not counted or used. The game software determines all of the initial "no-line" fields and tests each of these for potential winners where all fields that can potentially complete a line are counted. Since there are over 100 million compliant field combinations, the player must examine each lineup and symbol values to determine the best location for selecting the wild symbol on the field displayed.

The Tic-Tac-Fruit electronic game does not pick random fields until testing indicates that one is acceptable. Instead, the field is constructed to meet certain criteria. The steps involved in constructing a field in this electronic game are as follows:

1. chose the number of winning lines (i.e., 1, 2, 3, 4);
2. chose the orientation of each of the winning lines (i.e., horizontal, vertical, or diagonal);
3. chose the symbols for each of the lines (i.e., cherries, plums, bells, etc.);
4. fill in empty spots with random symbols; and
5. test the complete field for compliance with the goals set by steps 1 and 3 and repeat the construction process if compliance fails.

Figure 1B:
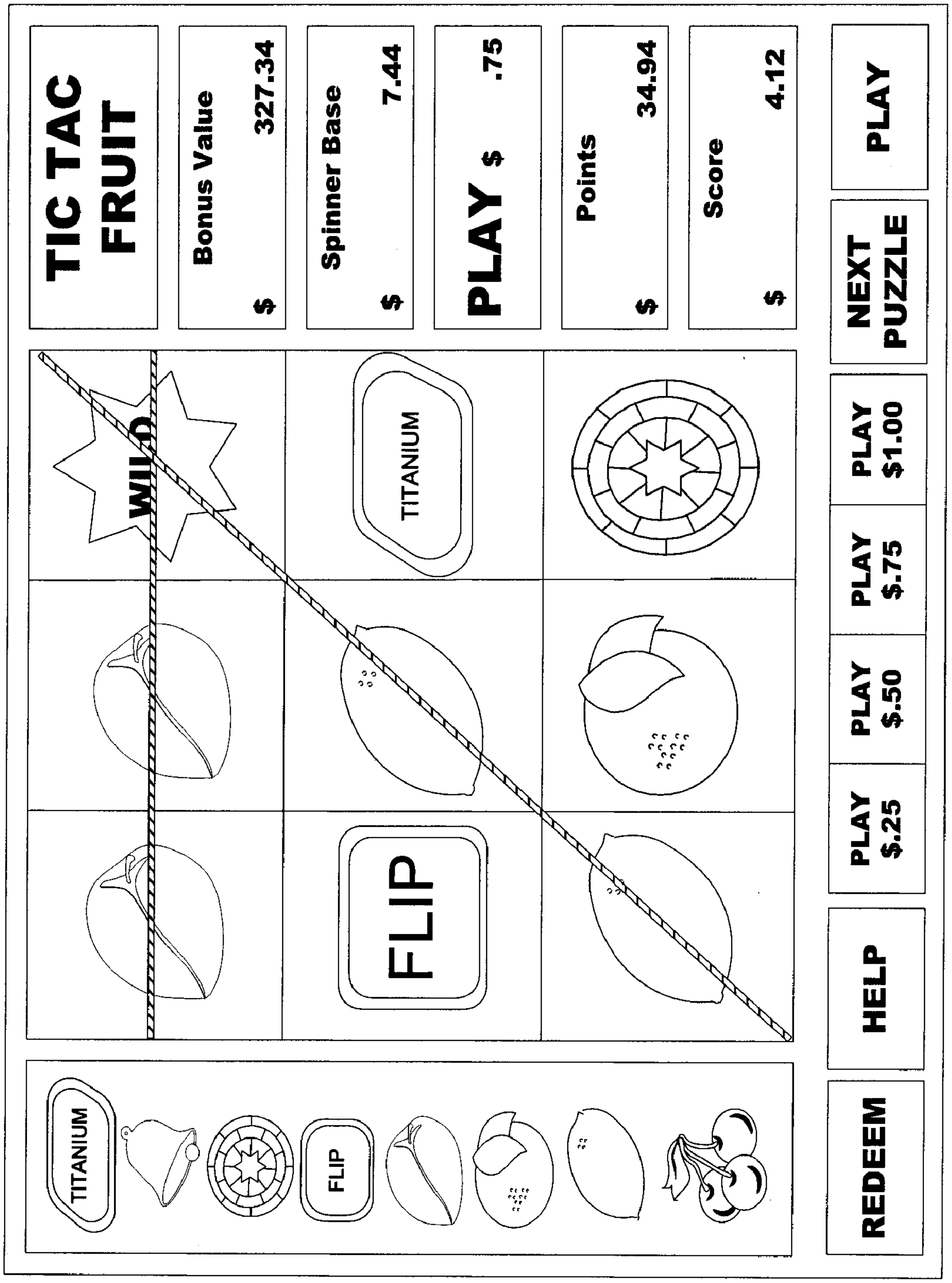

One variation of the Tic-Tac-Fruit electronic game presents a game theme that is based primarily on fruit symbols. There are eight symbols and therefore eight different winning combinations. An exemplary touch screen display for this game is illustrated in FIG. 1A. The different symbols that can be displayed are shown in the left column of the display. The player selects a denomination for the next play of the game from among the denominations available on the bottom of the display. In this example, the player has selected $0.75. The game grid depicted does not show any complete lines. Once the player selects the "Play" icon, he must decide which element on the display grid to select as the location of the wild symbol. As illustrated in FIG. 1B, the player selected the space in the upper right corner of the display grid which resulted in the simultaneous completion of two lines, i.e., a horizontal line and a diagonal line.

An exemplary award schedule for this version of the Tic-Tac-Fruit electronic game is provided in Table 1. The column headings represent denominations of play. In other words, the column headings represent the amount that the player can select for each play. The higher the denomination selected, the greater the potential winnings for each of the winning combinations. For example, if the player selects fifty cents as the denomination for the next play of the electronic game, and completes a line with three titanium symbols, he will win the equivalent of $250.00 in points. Had he successfully played the same game with a $4.00 denomination of play, his winnings would have been the equivalent of $2,000.00 in points. Likewise, if the player had selected a denomination of $2.00 and made a location selection for the wild symbol that simultaneously completed a line of three bells and a line of three plums, his winnings would have been the equivalent of $14.00 in points, $10.00 for the line of three bells and $4.00 for the line of three plums. The prizes marked with an asterisk are progressive value prizes. The value awarded for these prizes will increase with every game played.

TABLE 1

| | Tic-Tac-Fruit (Classic) | | | |
|---|---|---|---|---|
| Symbol/Denomination | 50¢ | $1.00 | $2.00 | $4.00 |
| 3 Titanium | $250* | $500* | $1,000* | $2,000* |
| 3 Spinner | 80¢ | $1.60* | $3.20* | $6.40* |
| 3 Flip | * | * | * | * |
| 3 Bell | $2.50 | $3 | $10 | $20 |
| 3 Plum | $1 | $2 | $4 | $8 |
| 3 Orange | 8¢ | 16¢ | 32¢ | 64¢ |
| 3 Lemon | 4¢ | 8¢ | 16¢ | 32¢ |
| 3 Cherry | 2¢ | 4¢ | 8¢ | 16¢ |

In game operation, a player inserts money into the Tic-Tac-Fruit electronic game device through a bill acceptor located on the front of the electronic game cabinet or console beneath the button panel. The bill acceptor accepts U.S. notes of varying denominations. Bills inserted are displayed on the video screen as points available for game play. The player selects the denomination of play by touching the appropriate icon for the price of game play. A player may change the desired denomination at any time prior to engaging in game play.

Game play begins with the player touching the "Play" icon on the video screen or pressing the "Play/Credit" button on the cabinet exterior. The video screen presents nine symbols in a three by three array to the player as discussed above. The object of the game is for the player to recognize the most rewarding game outcome and to select the appropriate element (i.e., field location) to change from the displayed symbol to a wild symbol in order to obtain the most valuable prize available for the displayed field.

As described above, the initial nine symbols displayed will not present an automatic winning combination. The player must engage in the selection of the field element to be replaced with a "wild" symbol in order to obtain a winning game outcome. The player has a finite length of time in which to select the appropriate field element to replace with the "wild" symbol. Failure to select a field element location for the wild symbol in the allotted time will result in a losing game outcome. In such an instance, the amount that would have been won is revealed to the player and placed into the "bonus pool" that will be won by the player successfully obtaining the top prize. Likewise, if a player selects a field element to replace with a wild symbol that does not obtain a winning outcome, or the best possible winning outcome, the amount that was not won is added to the bonus pool. In the case of the player not obtaining the best possible outcome, the difference between the prize won and the best possible prize is added to the bonus pool.

Essentially, the Tic-Tac-Fruit electronic game presents a task whereby the player must select the appropriate field element to replace with a wild symbol in an effort to obtain the highest value game outcome offered by the device. The prize is determined by a random selection from a finite pool of available prizes. The device selects the quantity of lines that will present a winning outcome. Prizes may be presented on one, two, three, or four lines in a single game play. The device selects the level of prize(s) to be awarded. A software algorithm assesses the arrangement of the prize(s) to be offered to assure that no other, more valuable prizes will inadvertently be presented. The key symbol needed to obtain the highest value prize is replaced with a non-winning symbol prior to display to the player.

The player may redeem accumulated credits after game play. Redemption of the credits is accomplished simply by pressing the "Ticket" button or touching the "Redeem" icon on the video screen. All accumulated credits will be redeemed as a cash voucher on a printed ticket. The printed ticket can be presented to a redemption counter within the venue for cash payment.

The Tic-Tac-Fruit game possesses a finite number of plays. The game is configured with electronic cartridges that contain a finite pool of game plays based upon eight different levels of winning prize values. The electronic cartridges are not accessible to the operator of the machine and cannot be changed. When the current allotment of finite game plays in one cartridge is depleted, the next cartridge is automatically selected by the device. When all of the electronic cartridges are depleted, the device will become disabled with a message stating "out of plays" on the lower center of the video screen. The device operator must purchase additional pools of game plays, which will be enabled with the correct entry of an eight digit pass code provided by the electronic game provider. Configuration of game play for a specific machine can only be done by software programming.

The quantity of game plays is also game theme specific, i.e., it varies based on the particular version of the Tic-Tac-Fruit electronic game that is placed in a venue. For the one described herein, there are three electronic cartridges provided with the game, with thirty-thousand plays per electronic cartridge for a total number of ninety thousand game play. The particular number of game plays for each version of the Tic-Tac-Fruit game are purchased by a device operator. The operator pays a flat licensing fee in order to obtain an eight digit pass code that must be correctly entered in order to enable the appropriate quantity of game plays for the various game themes.

Each purchase level of each game theme is merely a multiple of a lowest game purchase level. Therefore, all game outcomes are derived from the same finite pool of game outcomes, regardless of purchase amount. Each time the player engages play, an outcome is selected at random from the finite pool of game outcomes. The manner in which the player plays the game determines whether the player will receive the winnings or if the winnings will go into the bonus pool, which will be awarded to the next player successfully obtaining the top prize.

By using the concept of a virtual cartridge to reload an electronic game console for plays, the electronic game service provider has been limited to a licensing fee for the game software which permits a finite number of plays, i.e., 30,000 per virtual cartridge, 90,000 total plays in the case of the Tic-Tac-Fruit game used as an example herein. In this system, the operator of the game receives 90,000 plays regardless of the denominations selected for play by the game players. The electronic game in an exemplary embodiment provides the player with four different play levels, e.g., $0.50, $1.00, $2.00 and $4.00. The operator can have the game console provide other denominations of play instead. If a player played the electronic game at the $0.50 level and uses all 90,000 plays available, the operator is going to make far less in profit than if the players had selected the $4.00 level for all plays. From the electronic game service provider's perspective charging a flat fee for the virtual cartridges, if all the games are played at the lowest denomination, the game operator may not make sufficient profit to make keeping the game console installed at the operator's location worthwhile. On the other hand, the flat fee charged may result in too small a profit for the electronic game service provider. Under current laws, the game provider does not have the option of charging the operator a fixed percentage of his profits for leasing the electronic game and software. Playing an electronic game with a finite structure (i.e., fixed number of plays) having a "jackpot" for each virtual cartridge provides the operator with access to information on the number of plays still remaining. The game operator could take advantage of this information to play the remaining games at the highest denomination to win the jackpot amount.

In an exemplary embodiment of the invention, a finite structure is provided for each denomination of play. The electronic game service provider still charges a flat licensing fee for each reload of the virtual cartridges. However, instead of a having a fixed number of plays available per load of the virtual cartridges, the number of plays available are based on the denominations that are available for player selection and are dynamically updated during operation of the game plays based on the actual denominations used by the players in actual game play on the electronic game console as described more fully below. For example, if all games are played at a $0.25 level, the operator could get 200,000 plays per load. If all games are played at a $5.00 level, the operator could get 75,000 plays per load. Since each game will be played multiple times at each possible denomination, the number of games remaining at each denomination is determined dynamically after each play. Note that in the context of this invention, denomination of play and level of play are used interchangeably.

Figure 2:
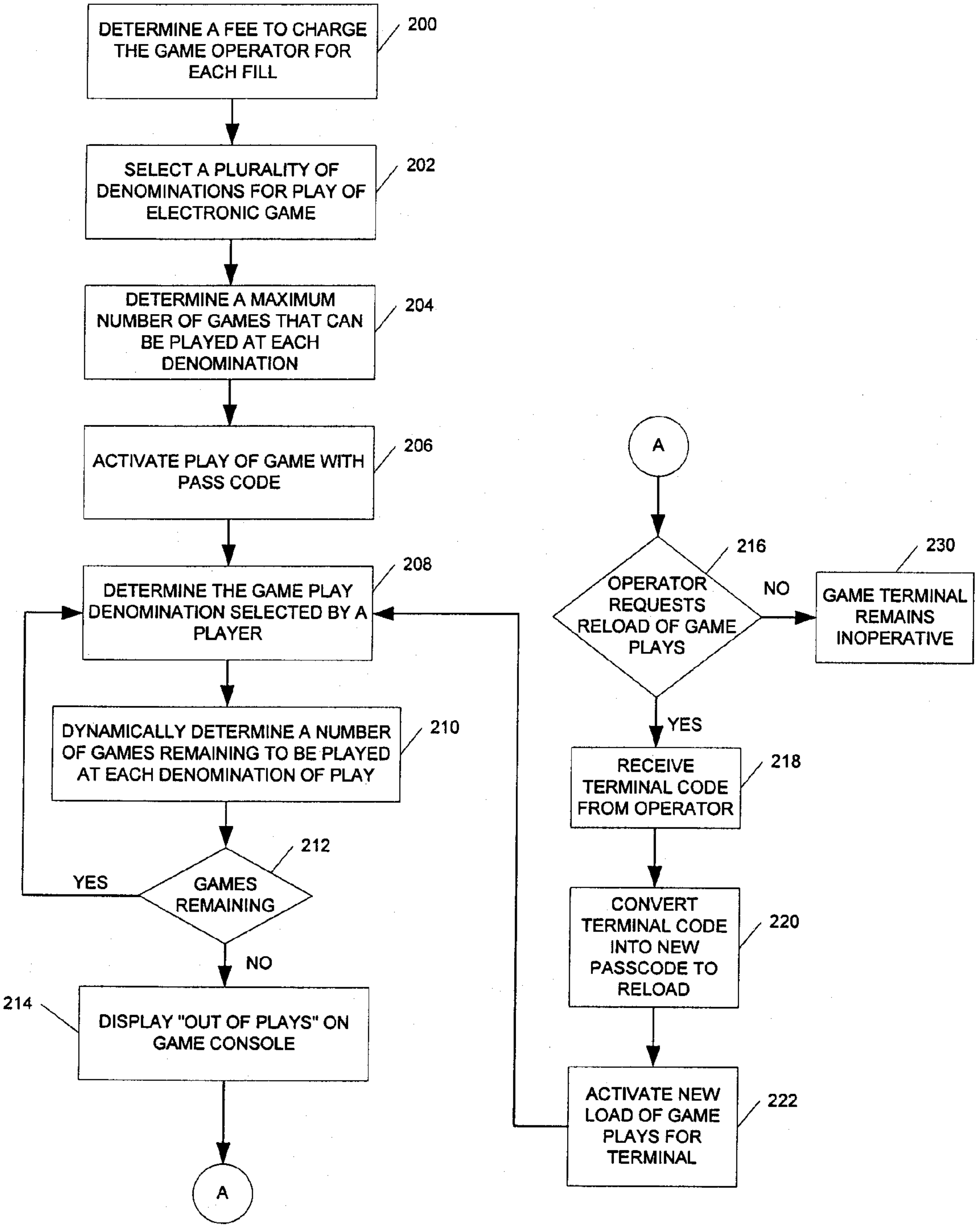
FIG. 2 illustrates processing logic for determining the remaining number of plays of an electronic game that are available at different denominations of play in an exemplary embodiment of the invention.

FIG. 2 illustrates processing logic for determining the remaining number of plays of an electronic game that are available at different denominations (i.e., levels) of play in an exemplary embodiment. The first few steps of the processing logic are performed before activation of the electronic game at the operator's venue with a "fill" or load of game plays. The electronic game service provider first determines the flat fee to be charged for the load of game plays as indicated in step 200. A plurality of denominations for play of the electronic game is selected as indicated in step 202. The denominations for an electronic game terminal can be preset by the electronic game service provider and changed by the operator. The electronic game service provider determines a maximum number of games that can be played at each of the plurality of denominations as indicated in step 204. This determination is made for each possible denomination of play although only four denominations are initially selected in the embodiment used for the Tic-Tac-Fruit game. The electronic game service provider provides a passcode that is generated from the terminal identifier to the operator. The operator then enters the passcode to activate game play as indicated in step 206. The electronic game software determines the denomination of play selected by the player in step 208. After each play of the game, the game software dynamically determines the number of games remaining to be played at each denomination of play as indicated in step 210. The number determined for each denomination of play reflects the number of games that could be played at the particular level of play.

After determining the number of plays remaining at each denomination, the game software determines if there are remaining games to be played as indicated in decision step 212. If there are games remaining to be played, the software returns to process step 208 for the next play of the game. If there are no games remaining to be played, the electronic game displays an "out of plays" message on the electronic game display as indicated in step 214. Next, in decision step 216, a determination is made as to whether the operator has requested a reload of game plays. Unless the operator requests a refill of the virtual game cartridge, the electronic game terminal remains inoperative as indicated in step 230. The operator requests a refill of game plays by sending the terminal identifier to the electronic game service provider in order to obtain a new passcode to reactivate the electronic game. The processing logic then returns to step 208 to wait for the next play of the electronic game.

Upon receiving the operator request for a refill of game plays (step 218), the electronic game service provider generates a new passcode for reloading the electronic game terminal that is based on the terminal identifier as indicated in step 220. The electronic game terminal is reactivated for play by entering the passcode into the terminal as indicated in step 222.

FIG. 3 illustrates an exemplary payout scheme for varying denominations of play in an exemplary embodiment. For the Tic-Tac-Fruit game used as an example herein, the electronic game service provider enables the operator to select four denominations for play. The first column 300 depicts the play denominations that can be selected. The second column 302 shows how much of the game play amount is returned to the player on average at each possible play denomination. The operator's profit per each game played at a particular denomination is shown in the third column 304 The total number of plays available at each denomination, if all game plays were made at a single denomination, is shown in the fourth column 306. As can be seen, the total number of plays available for each denomination per load varies non-linearly from 200K at the $0.25 level of play to 75K at the $3.00, $4.00 and $5.00 levels of play. The total number of games per load will vary based on actual denominations selected by the players. The electronic game service provider's profits at each denomination of play is shown in the fifth column 308. The percentage shown is expressed as a percentage of the operator's per game profit. For example, the electronic game service provider's profit per play at the $4.00 level of play is $0.0156 which is 6.5% of the operator's corresponding profit of $0.21 per play. It should be noticed that in this example, the game provider profit per play is variable and non-linear based on the different denominations. The next column 310 indicates the equivalent amount that the game provider would have to "charge per each play" at each denomination to reach the flat fee that is actually charged per load. In other words, the electronic game service provider charges a flat fee per load of the virtual cartridges. If all the games were played at a particular denomination, e.g. $1.00, the total number of games played allowed by the game software control would be 120K and the equivalent game provider charge per play at this level would be $0.00975. The last column indicates the operator's total profit per fill of the virtual cartridge if all games were played at the particular denomination. For example, if all games were played at the $0.25 level, the operator would make a total profit of $7500 taking into consideration the percentage amount returned to game players. If all games were played at the $5.00 level, the operator's profit per fill would be $18, 750.00.

FIG. 4 illustrates game terminal status receipts available to the operator of electronic games in the "plays level" exemplary embodiment. In FIG. 4, the first column 400 labeled "CRD" represents multiples of the lowest denomination game play ($0.25 in this example). The second column 402 labeled "Value" indicates the denomination of play, ranging from $0.25 to $5.00. The third column 404 labeled "Count" represents the number of plays available at a particular denomination, if all games were played at the same level. The fourth column 406 labeled "Plays" indicates the number of games played at the corresponding levels in the "Value" column. In this sample terminal status receipt, two games have been played at the $0.50 level, one game at the $1.00 level and two games at the $4.00 level. The column total shows that eight games have been played on this game terminal. The next column 408 labeled "Rate-Use %" indicates the percentage of games that have been played at the corresponding play level. For example, 0.0067% of the available games at the $4.00 level per virtual cartridge load have been played. The final column 410 labeled "Left" indicates the remaining number of games available at a particular pay level as game play proceeds. The numbers in this column are determined dynamically after each game play. After the first eight game plays, there are 74,993 games remaining at the $3.00, $4.00 or $5.00 levels. The numbers in this column take into consideration each previous play of the electronic game and the denomination at which each game was played.

Figure 5:
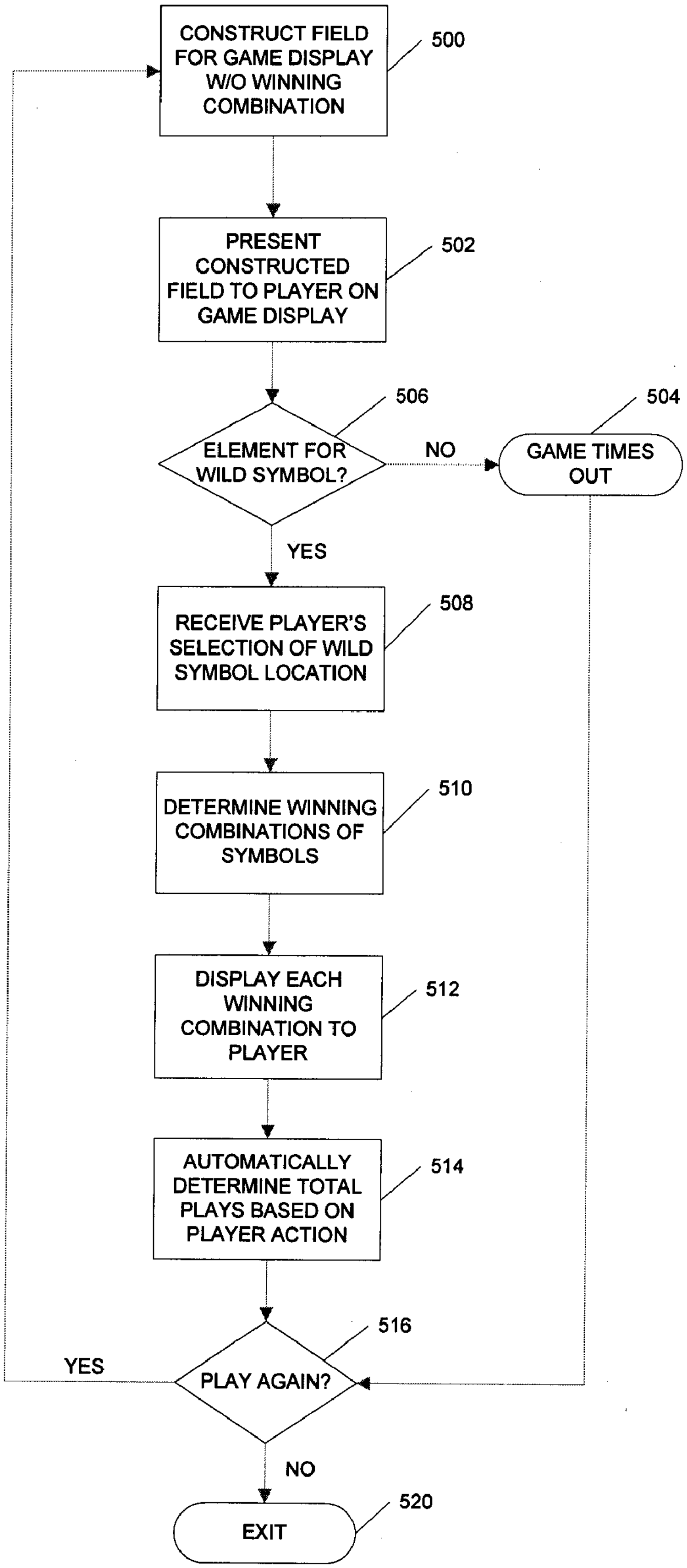
FIG. 5 illustrates the processing logic for controlling a total number of plays of an electronic game based on a player's action taken prior to selecting a displayed game field element to change to a wild symbol in an exemplary embodiment.

FIG. 5 illustrates the processing logic for controlling a total number of plays of an electronic game based on a player's action taken prior to selecting a displayed game field element to change to a wild symbol in an exemplary embodiment. Processing begins, as indicated in step 500, with the construction of a field of elements for a game display wherein each element is filled by a game symbol from the game symbols available. The underlying software algorithms follow several rules of game field construction before displaying the field to the player. These rules include selecting a number of winning combinations for a play of the game; selecting the orientation of each winning combination on the game grid; selecting the symbols for each winning combination; randomly selecting symbols for the remaining elements of the game grid; and testing the field for compliance with at least one of the preceding selections prior to presenting the field to the player. The displayed game field cannot contain a winning combination before play. The field is presented to the player in step 502.

One the constructed field is displayed to the player, the player has a finite time in which to make a decision regarding the element in the displayed field to select for the wild symbol. If the player fails to make a selection, the game times out (step 504). Otherwise, the player makes a selection of a wild symbol location in the displayed field in decision step 506. The game software receives and processes the player's selection of a wild symbol location in step 508. The game software determines the winning combinations of symbols in step 510, and displays the winning combinations to the player in step 512. The game software automatically determines the total number of plays of the game based on the player's action before commencing the game play in step 514. In an exemplary embodiment, such action can be the player's selection of a denomination of play. When the player selects a higher denomination of play, the number of remaining games available decreases at a faster rate than if a lower denomination of play is selected. Consequently, the total number of game plays are controlled by each such player action. In decision step 516, the player can opt to play again or end game play (step 520).

Figure 6:
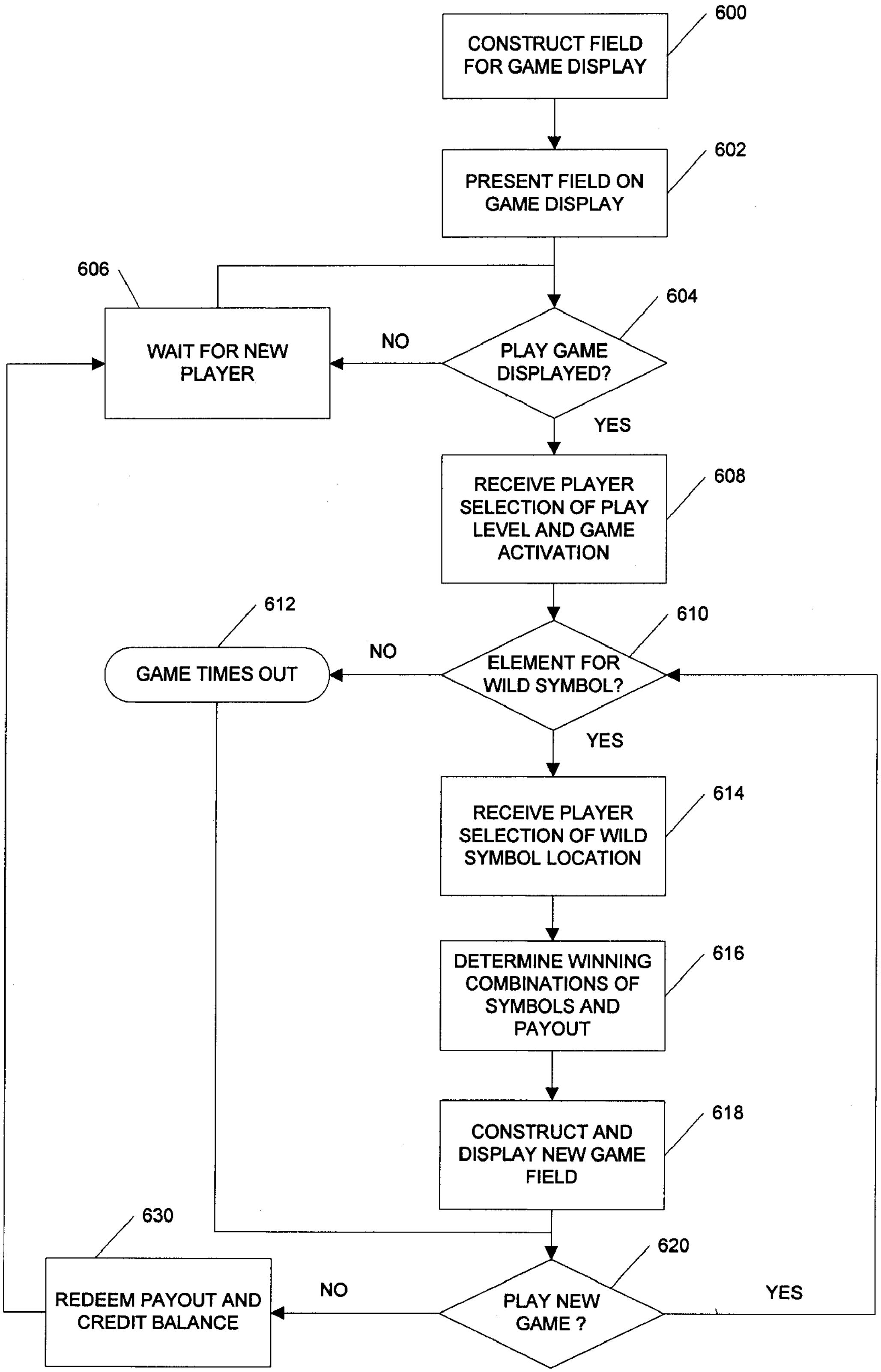
FIG. 6 illustrates the processing logic for an exemplary embodiment of the invention having a game preview display.

FIG. 6 illustrates the processing logic for an exemplary embodiment having a game preview display. Processing begins, as indicated in step 600, with the construction of a field of elements for a game display wherein each element is filled by a game symbol from the game symbols available. As described above, underlying software algorithms follow several rules of game field construction before displaying the field to the player. These rules include selecting a number of winning combinations for a play of the game; selecting the orientation of each winning combination on the game grid; selecting the symbols for each winning combination; randomly selecting symbols for the remaining elements of the game grid; and testing the field for compliance with at least one of the preceding selections prior to presenting the field to the player. The displayed game field cannot contain a winning combination before play. The field is presented to the player on the game display as a preview of the game in step 602. In one embodiment, the player can select from a plurality of game preview displays, with each game preview being associated with a different play level. Any potential player can observe the game display for as long as desired before making a decision to play the displayed game in decision step 604. The electronic game software remains in a wait state until a player decides to play the displayed game as indicated in step 606. The electronic game receives a player's selection of a play level (i.e., denomination of play) and activates the game when the "Play" button is touched as indicated in step 608.

Once the electronic game is activated for play, the player must decide which element to change to the wild symbol on the touch screen as indicated in decision step 610. If the player fails to select an element to change to the wild symbol within a predetermined amount of time, the game times out as indicated in step 612 and the player loses an amount that is equal to the level of play (e.g., if the player selected $4.00 as the level of play for the game, this amount will be deducted from any remaining balance the player may have). The game software receives the player's selection of the wild symbol as indicated in step 614. The game software processes the player's selection of a wild symbol location and determines the winning combinations of symbols and corresponding payout in step 616. The game software also displays the winning combinations to the player in this step. The game software can then construct and display a new game field as indicated in step 618. The game display is constructed using the same rules described herein. Referring to FIGS. 1A-1B, the player can select the "Next Puzzle" or similarly labeled buttons to preview the next game. By selecting the play level (i.e., denomination of play), the player can preview the next game at the selected play level. The player can preview the next game at each play level before choosing the game to play. The game software then waits for the current player to decide whether or not to play the new game displayed as indicated in decision step 620. Selecting play will return processing logic to step 610 where the game waits for a selection of an element to change to the wild symbol. If the player chooses not to play the new game displayed in decision step 620, the player redeems the payout won and any credit balance that the player may have as indicated in step 630. From step 630, processing logic returns to step 606 to wait for a new player.

The preview screen of the present invention can be used in various additional embodiments. These additional embodiments can be implemented without the use of a wild symbol. In the context of the electronic game having an array of symbols as described herein, the game preview screen can be constructed and displayed without the need for a player to do anything other than to select "Play." In this case, the preview screen could actually be the results screen, displaying the game outcome. Such a preview screen could display a winning or a non-winning combination. The player would play the displayed game knowing the outcome in order to have the electronic gaming system provide the next game preview display.

Figure 7:
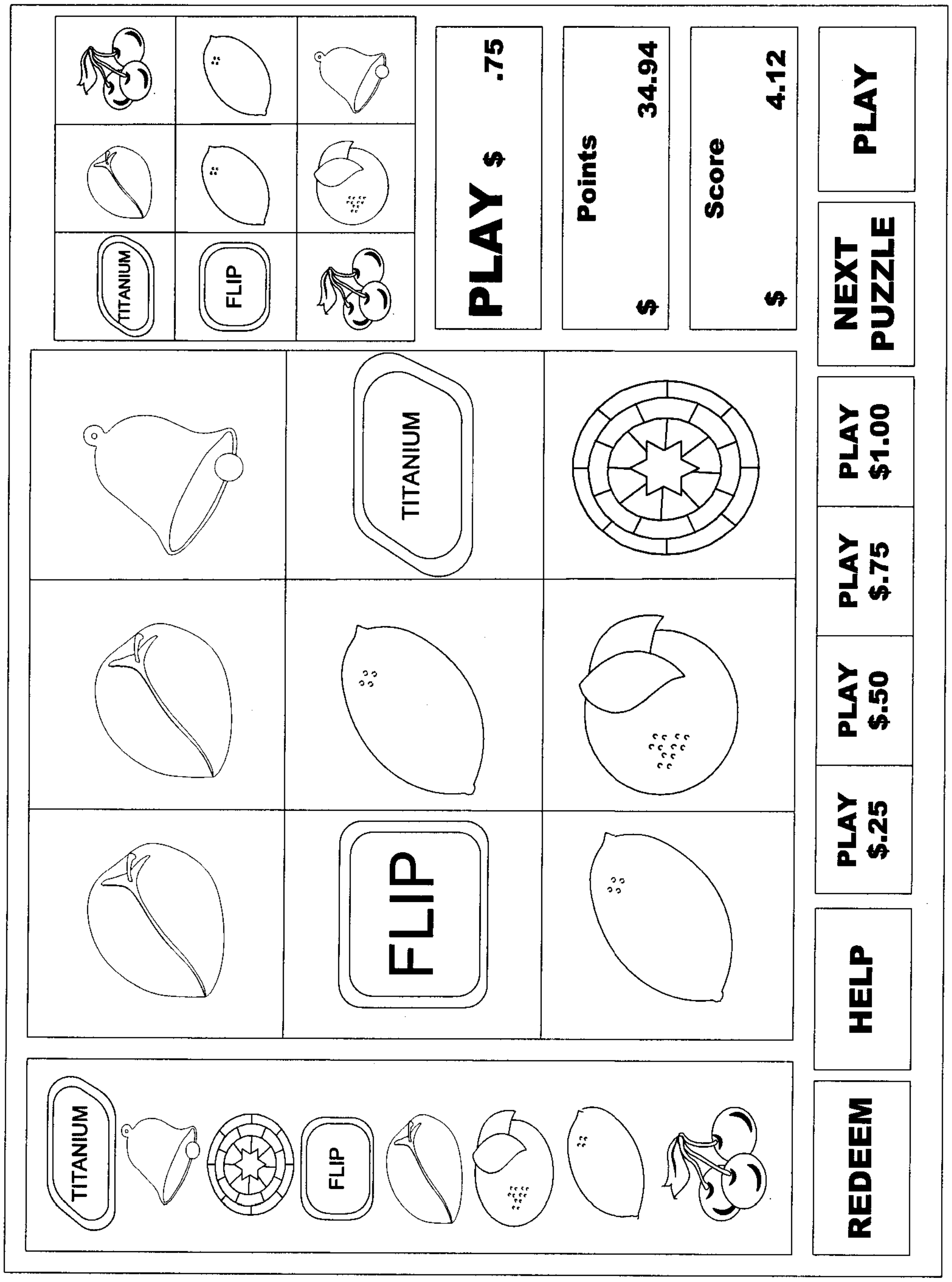
FIG. 7 illustrates an exemplary game display having a preview screen displayed adjacent to the current game display.

A preview of the next game could be displayed adjacent to the current preview screen. In order to get to the next game, the player would have to play the currently previewed game. An example of such a game display is depicted in FIG. 7 in which the current game is previewed on the main portion of the display and the next game (e.g., at the same play level or denomination) is displayed adjacent to the current game display in the upper right portion of the display. The exact location of the adjacent game preview is not important, but the smaller game preview on the display device must have sufficient resolution to provide a clear, unambiguous preview of the next game. After the player plays the game displayed in the main portion of the display, the previously displayed smaller game preview will be displayed on the main portion of the display and a new game preview will be displayed adjacent to the main display.

The preview display could also be implemented in other forms of electronic or electromechanical games. For example, it could be used in the context of an electronic or electromechanical slot machine having a plurality of spinning reels (actual or simulated) and displaying one or more lines of symbols. The displayed game could actually be the result which may or may not be a winning combination of symbols. The player would play the displayed game, knowing its result, in order to preview the next game. The preview screen could also be implemented in an electronic game having a plurality of reels, each reel having a plurality of symbols, and a nudge feature and/or wild symbol. The game display could have a next game preview positioned in a space adjacent or in proximity to the main game display. A nudge game is one in which the player has an option to nudge one of the reels up or down one or more positions after the reels stop spinning in order to achieve a winning combination, usually along a pay line associated with the plurality of reels.

Figure 8:
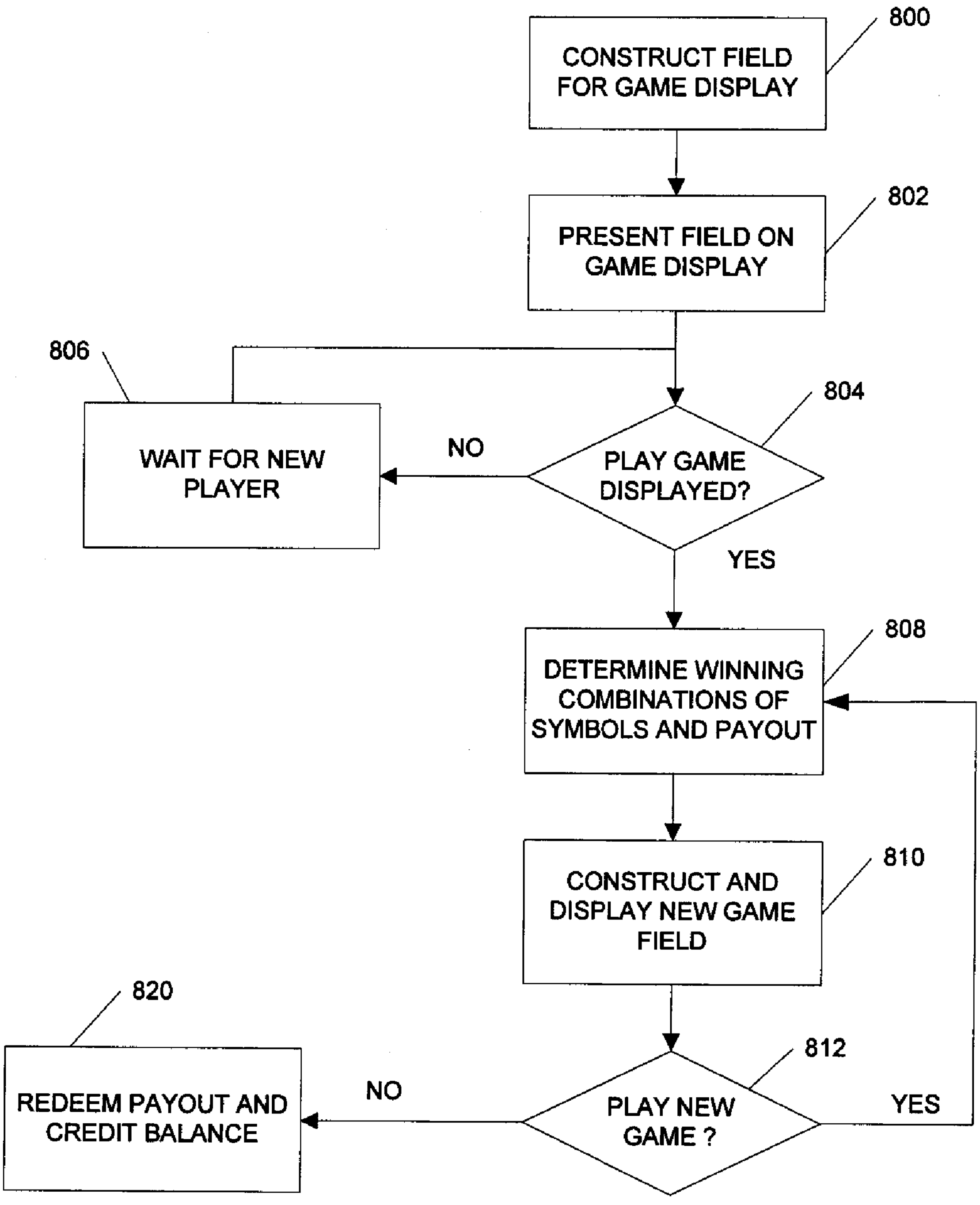
FIG. 8 illustrates the processing logic for another exemplary embodiment of the invention having a game preview display.

FIG. 8 illustrates the processing logic for other exemplary embodiments of the invention having a game preview display. The logic is a subset of the processing logic illustrated in FIG. 6 in which player interaction is required in order to play the displayed game. Processing begins as indicated in step 800 with the construction of a field for the game display. Depending on the specific game, the field can be constructed in various ways that are known to those skilled in the art. The field is then displayed to the player on the game display as indicated in step 802. The game displayed may contain a winning combination on a single or multiple lines depending on the type of game. The player can observe the displayed game for any length of time before deciding whether or not to play the displayed game in decision step 804, in order to advance to the next game preview display. If the result of the play of the game is a winning combination, the game software determines the winnings and displays the winning outcome to the player, as indicated in step 808. The player can then select "Preview" or "Next Puzzle" to have the next game displayed, or the next game already could be displayed adjacent to the current game display. This is indicated in step 810. The game software remains in a wait state until a player decides to play the displayed game as indicated in decision step 812. Selecting play will return processing logic to step 808. If the player chooses not to play the new game in decision step 812, the player redeems the payout won and any credit balance that the player may have as indicated in step 820.

The present invention of an electronic game in its various embodiments has been described as a combination of hardware and software components. It is important to note, however, that those skilled in the art will appreciate that the software of the present invention is capable of being distributed as a program product in a variety of forms, and that the present invention applies regardless of the particular type of signal bearing media utilized to carry out the distribution. Examples of signal bearing media include, without limitation, recordable-type media such as diskettes or CD ROMs, and transmission type media such as analog or digital communications links.

The corresponding structures, materials, acts, and equivalents of all means plus function elements in any claims below are intended to include any structure, material, or acts for performing the function in combination with other claim elements as specifically claimed.

Those skilled in the art will appreciate that many modifications to the exemplary embodiment are possible without departing from the spirit and scope of the present invention. In addition, it is possible to use some of the features of the present invention without the corresponding use of the other features. Accordingly, the foregoing description of the exemplary embodiment is provided for the purpose of illustrating the principles of the present invention and not in limitation thereof since the scope of the present invention is defined solely by the appended claims.

What is claimed is:

1. An electronic gaming method comprising the steps of:

constructing a game field having a plurality of elements for an interactive touch screen game display on an electronic game terminal wherein each element is filled by a game symbol from a plurality of predetermined game symbols, wherein the game symbols for each element are automatically determined such that there is at least one winning combination for each play of the game but there is no winning combination without player interaction with the game display;

testing the game field prior to displaying the game to the player to ensure that a winning combination more valuable than the determined winning combination is not generated inadvertently in completing the field;

automatically displaying an actual game to be played on the touch screen display to a player prior to initiating activation of game play;

receiving the player's selection of a field element as a location for a wild symbol and determining each winning combination of symbols that is formed by such selection; and displaying each winning combination of symbols on the touch screen display.

2. The electronic gaming method of claim 1 further comprising the steps of receiving the player's selection of a play level and activating game play.

3. The electronic gaming method of claim 1 further comprising the step of determining if the player has decided to play the game field displayed on the game display.

4. The electronic gaming method of claim 3 further comprising the step of redeeming a player's credit balance and an associated payout for each winning combination of symbols on each game previously played.

5. The electronic gaming method of claim 1 wherein the constructed field is a two-dimensional array having a plurality of rows and columns.

6. The electronic gaming method of claim 1 wherein the step of constructing the field comprises:

determining an orientation of each winning combination for the play of the game;

determining the symbols for each of the winning combinations; and randomly determining symbols for the remaining elements of the field.

7. The electronic gaming method of claim 6 wherein the orientation of each winning combination is horizontal, vertical or diagonal.

8. The electronic gaming method of claim 1, further comprising the steps of:

constructing a plurality of game fields each having a plurality of game symbols, with each game field corresponding to a selectable level of play; and automatically displaying each of the plurality of game fields on the touch screen game display sequentially for each selectable level of play, wherein the player's selection of the level of play determines which of the sequentially displayed games is actually played.

9. The electronic gaming method of claim 8 further comprising receiving the player's selection of a sequentially displayed game to play.

10. The electronic gaming method of claim 1 wherein each winning combination of symbols has an associated payout to the player.

11. The electronic gaming method of claim 1 wherein each winning combination of symbols has a predetermined probability of occurrence for a play of the game.

12. The electronic gaming method of claim 1 wherein the denomination of play corresponds to the level of play.

13. An electronic gaming system comprising:

an electronic game terminal including a touch screen display;

a game processor for generating an interactive electronic game on the game terminal with a plurality of options selectable by a player, the game processor configured for:

constructing a game field having a plurality of elements for the interactive game display wherein each element includes a game symbol from a plurality of predetermined game symbols, wherein the game symbols for each element are automatically determined such that there is at least one winning combination for each play of the game but there is no winning combination without player interaction with the game display;

testing the game field prior to displaying the game to the player to ensure that a winning combination more valuable than the determined winning combination is not generated inadvertently in completing the field;

automatically displaying an actual game to be played on the touch screen game display prior to initiating activation of game play;

receiving the player's selection of a field element as a location for a wild symbol and determining each winning combination of symbols that is formed by such selection; and displaying each winning combination of symbols on the touch screen display.

14. The electronic gaming system of claim 13 wherein the game processor is further configured for receiving the player's selection of a play level and activating game play.

15. The electronic gaming system of claim 13 wherein the game processor is further configured for determining if the player has decided to play the game field displayed on the game display.

16. The electronic gaming system of claim 15 wherein the game processor is further configured for redeeming a player's credit balance and an associated payout for each winning combination of symbols on each game previously played.

17. The electronic gaming system of claim 16 wherein the denomination of play corresponds to the level of play.

18. The electronic gaming system of claim 13 wherein the game processor is further configured for constructing the field as a two-dimensional array having a plurality of rows and columns.

19. The electronic gaming system of claim 13 wherein the game processor is further configured for:

determining an orientation of each winning combination for the play of the game;

determining the symbols for each of the winning combinations; and randomly determining symbols for the remaining elements of the field.

20. The electronic gaming system of claim 19 wherein the orientation of each winning combination is horizontal, vertical or diagonal.

21. The electronic gaming system of claim 13 wherein each winning combination of symbols has an associated payout to the player.

22. The electronic gaming system of claim 13 wherein each winning combination of symbols has a predetermined probability of occurrence for a play of the game.

23. The electronic gaming system of claim 13 wherein the game processor is further configured for:

constructing a plurality of game fields each having a plurality of game symbols, with each field corresponding to a selectable level of play; and automatically displaying each of the plurality of game fields on the touch screen game display sequentially for each selectable level of play, wherein the player's selection of the level of play determines which of the sequentially displayed games is actually played.

24. The electronic gaming system of claim 23 wherein the game processor is further configured for receiving the player's selection of a sequentially displayed game to play.

25. A computer program product for electronic gaming when executed on a game processor, the computer program product comprising a computer readable storage medium having computer readable code embedded therein, the computer readable storage medium comprising:

program instructions that construct a game field having a plurality of elements for an interactive touch screen game display on an electronic game terminal wherein each element is filled by a game symbol from a plurality of predetermined game symbols, wherein the game symbols for each element are automatically determined such that there is at least one winning combination for each play of the game but there is no winning combination without player interaction with the game display;

program instructions that test the game field prior to displaying the game to the player to ensure that a winning combination more valuable than the determined winning combination is not generated inadvertently in completing the field;

program instructions that automatically display an actual game to be played on the touch screen game display to a player prior to initiating activation of game play;

program instructions that receive the player's selection of a field element as a location for a wild symbol and determine each winning combination of symbols that is formed by such selection; and program instructions that display each winning combination of symbols on the touch screen display.

26. The computer program product for electronic gaming of claim 25 further comprising program instructions that receive the player's selection of a play level and activate game play.

27. The computer program product for electronic gaming of claim 25 further comprising program instructions that determine if the player has decided to play the game field displayed on the game display.

28. The computer program product for electronic gaming of claim 27 further comprising program instructions that redeem a player's credit balance and an associated payout for each winning combination of symbols on each game previously played.

29. The computer program product for electronic gaming of claim 25 wherein the field is a two-dimensional array having a plurality of rows and columns.

30. The computer program product for electronic gaming of claim 25 wherein the program instructions that construct the field comprise:

program instructions that determine an orientation of each winning combination for the play of the game;

program instructions that determine the symbols for each of the winning combinations; and program instructions that randomly determine symbols for the remaining elements of the field.

31. The computer program product for electronic gaming of claim 30 wherein the orientation of each winning combination is horizontal, vertical or diagonal.

32. The computer program product for electronic gaming of claim 25 wherein each winning combination of symbols has an associated payout to the player.

33. The computer program product for electronic gaming of claim 25 wherein each winning combination of symbols has a predetermined probability of occurrence for a play of the game.

34. The computer program product for electronic gaming of claim 25 wherein the denomination of play corresponds to the level of play.

35. The computer program product for electronic gaming of claim 25 further comprising:

program instructions that construct a plurality of game fields each having a plurality of game symbols, with each game field corresponding to a selectable level of play; and program instructions that display each of the plurality of game fields on the touch screen game display sequentially for each selectable level of play, wherein the player's selection of the level of play determines which of the sequentially displayed games is actually played.

36. The computer program product for electronic gaming of claim 35 further comprising program instructions that receive the player's selection of a sequentially displayed game to play.

37. An electronic gaming method comprising the steps of:

constructing a game field having a plurality of elements for an interactive touch screen game display on an electronic game terminal wherein each element is filled by a game symbol from a plurality of predetermined game symbols;

determining at least one winning combination for each play of the game;

testing the game field prior to displaying the game to the player to ensure that a winning combination more valuable than the determined winning combination is not generated inadvertently in completing the field;

automatically displaying an actual game to be played on the touch screen game display to a player prior to initiating activation of game play;

determining if the player has decided to play the displayed game; and displaying an outcome resulting from play of the displayed game.

38. The electronic gaming method of claim 37 further comprising generating and displaying an additional game field simultaneously on the game display in proximity to the displayed game.

39. The electronic gaming method of claim 38 wherein the additional game field is for a next game to be played.

40. The electronic gaming method of claim 37 wherein the displayed game comprises a two-dimensional array of game symbols.

41. The electronic gaming method of claim 37 wherein the displayed game comprises a one-dimensional array of game symbols.

42. The electronic gaming method of claim 37 wherein the displayed game comprises a plurality of vertically-oriented reels, each having a plurality of game symbols.

43. The electronic gaming method of claim 42 wherein an outcome of the displayed game can be changed by moving a reel up or down at least one position in order to replace a current symbol on a pay line.

44. An electronic gaming system comprising:

an electronic game terminal including a touch screen display;

a game processor for generating an interactive electronic game on the game terminal, the game processor configured for:

constructing a field having a plurality of elements for the interactive game display wherein each element includes a game symbol from a plurality of predetermined game symbols;

determining at least one winning combination for each play of the game;

testing the game field prior to displaying the game to the player to ensure that a winning combination more valuable than the determined winning combination is not generated inadvertently in completing the field;

automatically displaying an actual game to be played on the touch screen game display to a player prior to initiating activation of game play;

determining if the player has decided to play the displayed game; and displaying an outcome resulting from play of the displayed game.

45. The electronic gaming system of claim 44 further comprising a component for generating and displaying an additional game field simultaneously on the game display in proximity to the displayed game.

46. The electronic gaming system of claim 45 wherein the additional game field is for a next game to be played.

47. The electronic gaming system of claim 44 wherein the displayed game comprises a two-dimensional array of game symbols.

48. The electronic gaming system of claim 44 wherein the displayed game comprises a one-dimensional array of game symbols.

49. The electronic gaming system of claim 44 wherein the displayed game comprises a plurality of vertically-oriented reels, each having a plurality of game symbols.

50. The electronic gaming system of claim 49 wherein an outcome of the displayed game can be changed by moving a reel up or down at least one position in order to replace a current symbol on a pay line.

51. A computer program product for electronic gaming when executed on a game processor, the computer program product comprising a computer readable storage medium having computer readable code embedded herein, the computer readable storage medium comprising:

program instructions that construct a game field having a plurality of elements for an interactive touch screen game display on an electronic game terminal wherein each element is filled by a game symbol from a plurality of predetermined game symbols;

program instructions that determine at least one winning combination for each play of the game;

program instructions that test the game field prior to displaying the game to the player to ensure that a winning combination more valuable than the determined winning combination is not generated inadvertently in completing the field;

program instructions that automatically display an actual game to be played on the touch screen game display to a player prior to initiating activation of game play;

program instructions that determine if the player has decided to play the displayed game; and program instructions that display an outcome resulting from play of the displayed game.

52. The computer program product for electronic gaming of claim 51 further comprising program instructions that generate and display an additional game field simultaneously on the game display in proximity to the displayed game.

53. The computer program product for electronic gaming of claim 52 wherein the additional game field is for a next game to be played.

54. The computer program product for electronic gaming of claim 51 wherein the displayed game comprises a two-dimensional array of game symbols.

55. The computer program product for electronic gaming of claim 51 wherein the displayed game comprises a one-dimensional array of game symbols.

56. The computer program product for electronic gaming of claim 51 wherein the displayed game comprises a plurality of vertically-oriented reels, each having a plurality of game symbols.

57. The computer program product for electronic gaming of claim 56 further comprising program instructions that enable a player to move a reel up or down at least one position to replace a current symbol on a pay line and change an outcome of the displayed game.

58. A method for displaying a plurality of electronic game fields for selection by a player before initiating play of a selected game comprising the steps of:

receiving a signal from the player to generate an interactive electronic game on a touch screen display of an electronic game terminal;

generating a game field having a plurality of elements for the interactive game display wherein each element is filled by a game symbol from a plurality of predetermined game symbols;

determining at least one winning combination for each play of the game;

testing the game field prior to displaying the game to the player to ensure that a winning combination more valuable than the determined winning combination is not generated inadvertently in completing the field;

automatically displaying an actual game to be played on the touch screen game display to a player prior to initiating activation of game play;

receiving a signal from the player to generate another of the plurality of electronic game fields associated with a different level of play prior to initiating activation of game play;

generating and automatically displaying another of the plurality of electronic game fields; and receiving the player's selection of the electronic game field to play prior to initiating activation of game play.

59. The method for displaying a plurality of electronic game fields of claim 58 further comprising generating and displaying a next game field simultaneously on the game display in proximity to a currently displayed game.

60. The method for displaying a plurality of electronic game fields of claim 58 wherein the displayed game comprises a two-dimensional array of game symbols.

61. The method for displaying a plurality of electronic game fields of claim 58 wherein the displayed game comprises a one-dimensional array of game symbols.

62. The method for displaying a plurality of electronic game fields of claim 58 wherein the displayed game comprises a plurality of vertically-oriented reels, each reel having a plurality of game symbols.

63. The method for displaying a plurality of electronic game fields of claim 62 wherein an outcome of the displayed game can be changed by moving a reel up or down at least one position in order to replace a current symbol on a pay line.

64. A system for displaying a plurality of electronic game fields each associated with a different level of play comprising:

an electronic game terminal including a touch screen display;

a game processor for generating an interactive electronic game display on a game terminal, the game processor configured for displaying a plurality of electronic game fields for selection by a player before initiating play of a selected game by:

receiving a signal from the player to generate an interactive electronic game;

generating a game field having a plurality of elements for the interactive game display wherein each element is filled by a game symbol from a plurality of predetermined game symbols;

determining at least one winning combination for each play of the game;

testing the game field prior to displaying the game to the player to ensure that a winning combination more valuable than the determined winning combination is not generated inadvertently in completing the field;

automatically displaying an actual game to be played on the touch screen game display to a player prior to initiating activation of game play;

receiving a signal from the player to generate another of the plurality of electronic game fields associated with another level of play prior to initiating activation of game play;

generating and automatically displaying another of the plurality of electronic game fields; and receiving the player's selection of the electronic game field to play prior to initiating activation of game play.

65. The system for displaying a plurality of electronic game fields of claim 64 further comprising a component for generating and displaying a next game field on the game display simultaneously in proximity to a currently displayed game.

66. The system for displaying a plurality of electronic game fields of claim 64 wherein the displayed game comprises a two-dimensional array of game symbols.

67. The system for displaying a plurality of electronic game fields of claim 64 wherein the displayed game comprises a one-dimensional array of game symbols.

68. The system for displaying a plurality of electronic game fields of claim 64 wherein the displayed game comprises a plurality of vertically-oriented reels, each reel having a plurality of game symbols.

69. The system for displaying a plurality of electronic game fields of claim 68 wherein an outcome of the displayed game can be changed by moving a reel up or down at least one position in order to replace a current symbol on a pay line.

70. A computer program product for displaying a plurality of interactive electronic game fields for selection by a player when executed on a processor, the computer program product comprising a computer readable storage medium having computer readable code embedded therein, the computer readable storage medium comprising:

program instructions that receive a signal from a player to generate interactive electronic game on a touch screen display of an electronic game terminal;

program instructions that generate a game field having a plurality of elements for the interactive game display wherein each element is filled by a game symbol from a plurality of predetermined game symbols;

program instructions that determine at least one winning combination for each play of the game;

program instructions that test the game field prior to displaying the game to the player to ensure that a winning combination more valuable than the determined winning combination is not generated inadvertently in completing the field;

program instructions that automatically display an actual game to be played on the touch screen game display to a player prior to initiating activation of game play;

program instructions that receive a signal from the player to generate another of the plurality of electronic game fields associated with a different level of play prior to initiating activation of game play;

program instructions that generate and automatically display another of the plurality of electronic game fields; and program instructions that receive the player's selection of the electronic game field to play prior to initiating activation of game play.

71. The computer program product for displaying a plurality of electronic game fields of claim 70 further comprising program instructions that generate and display a next game field on the game display simultaneously in proximity to a currently displayed game.

72. The computer program product for displaying a plurality of electronic game fields of claim 70 wherein the displayed game comprises a two-dimensional array of game symbols.

73. The computer program product for displaying a plurality of electronic game fields of claim 70 wherein the displayed game comprises a one-dimensional array of game symbols.

74. The computer program product for displaying a plurality of electronic game fields of claim 70 wherein the displayed game comprises a plurality of vertically-oriented reels, each reel having a plurality of game symbols.

75. The computer program product for displaying a plurality of electronic game fields of claim 70 further comprising program instructions that enable a player to move a reel up or down at least one position to replace a current symbol on a pay line and change an outcome of the displayed game.

* * * * *